United States Patent [19]

Gauthier et al.

[11] Patent Number: 4,591,749
[45] Date of Patent: May 27, 1986

[54] PERMANENT MAGNET ROTOR WITH INTERFIT CAGE STRUCTURE

[75] Inventors: Robert E. Gauthier, Willington, Mass.; Mark Susser, Albany, N.Y.

[73] Assignee: Ex-Cell-O Corporation, Troy, Mich.

[21] Appl. No.: 714,644

[22] Filed: Mar. 21, 1985

[51] Int. Cl.$^4$ .................. H02K 21/16; H02K 1/06
[52] U.S. Cl. .................................. 310/156; 29/598; 310/43
[58] Field of Search .............. 310/42, 43, 153, 156, 310/161, 211, 212, 261, 263, 265; 29/598

[56] References Cited

U.S. PATENT DOCUMENTS

| | | | |
|---|---|---|---|
| 1,783,344 | 12/1930 | Reis | 310/156 |
| 3,422,294 | 1/1969 | Parker | 310/42 |
| 4,219,752 | 8/1980 | Katou | 310/156 |
| 4,433,261 | 2/1984 | Nashiki et al. | 310/156 |
| 4,469,972 | 9/1984 | Rampignon et al. | 310/42 |
| 4,513,216 | 4/1985 | Müller | 310/156 |

Primary Examiner—Patrick R. Salce
Assistant Examiner—D. L. Rebsch
Attorney, Agent, or Firm—John P. Moran

[57] ABSTRACT

A permanent magnet rotor, wherein a magnet cage includes a plurality of equally spaced, longitudinally extending, selectively shaped legs, a sleeve mounted within the inner surfaces of the legs, and a shaft press fitted through the sleeve. A plurality of wedge-shaped magnets are inserted between adjacent legs around the sleeve, retained by the shapes of adjacent leg surfaces. A cover plate having chamfered slots is mounted on the leg ends against the magnets. The ends of the legs are staked in the chamfered slots to secure the rotor assembly.

2 Claims, 6 Drawing Figures

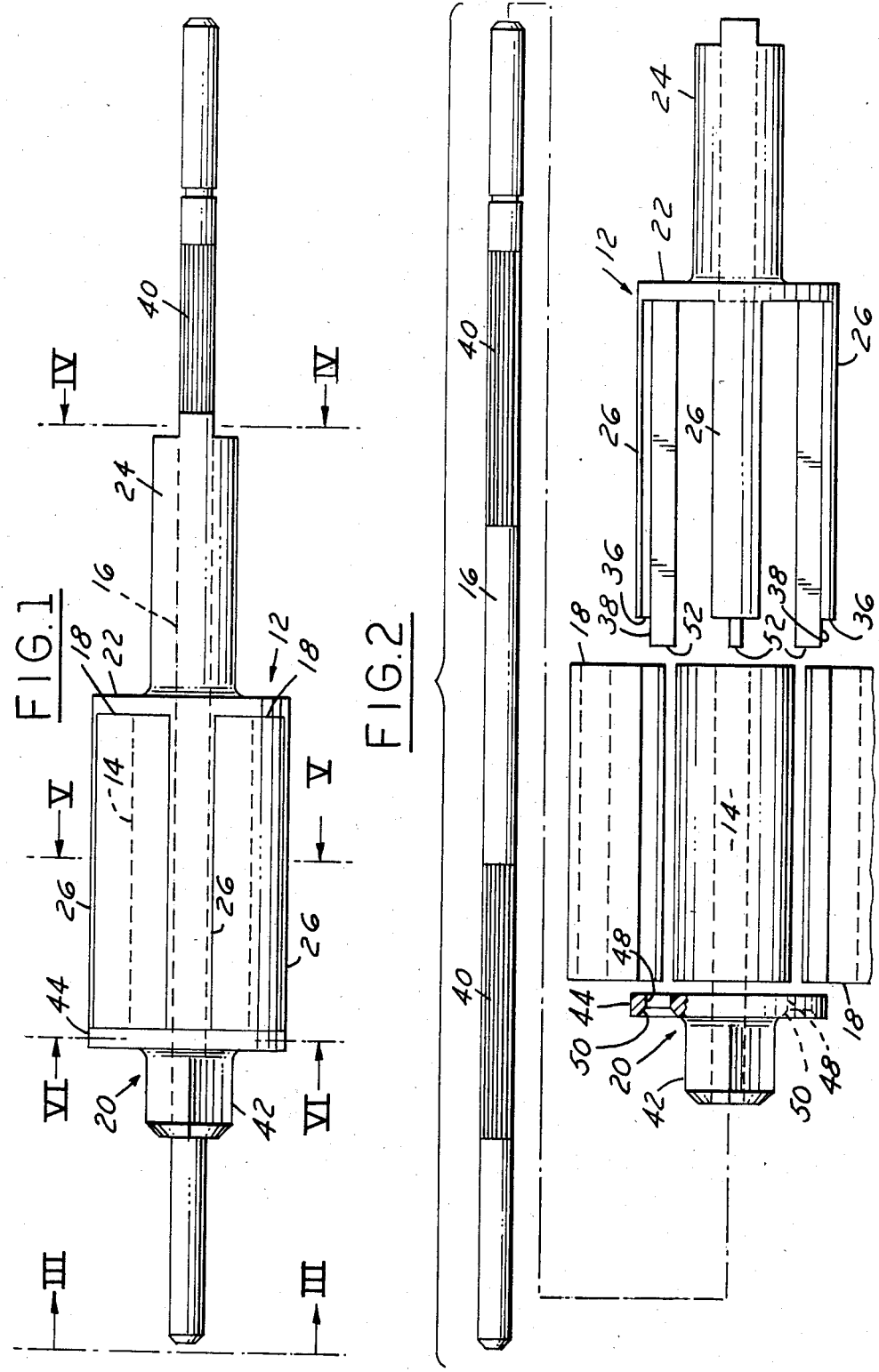

PERMANENT MAGNET ROTOR WITH INTERFIT CAGE STRUCTURE

TECHNICAL FIELD

This invention relates generally to rotor assemblies and, more particularly, to an improved permanent magnet rotor assembly and method of assembly thereof.

BACKGROUND ART

Heretofore, rotor assemblies have included magnets selectively placed within various encompassing sleeve and/or housing arrangements, wherein the final assembly is retained together by rivets (U.S. Pat. Nos. 3,657,582 and 2,060,259), or by being heat shrunk together (U.S. Pat. No. 3,531,670), or by being punch rammed together (U.S. Pat. No. 4,433,473), or by a locking wedge action (U.S. Pat. No. 4,339,874). In the Commutator Assembling Machine shown and described in U.S. Pat. No. 2,755,538, a staking ram is used to stake the cylindrical upper end of a central sleeve against a concentric chamfered surrounding locking ring, within a plurality of radially positioned wedge-shaped commutator conducting bars.

DISCLOSURE OF THE INVENTION

A general object of the invention is to provide an improved rotor assembly and method of assembling same.

Another object of the invention is to provide an improved rotor assembly method embodying staking for the final retention of the assembly.

A further object of the invention is to provide a rotor assembly wherein a plastic, radially slotted cover plate is mounted on and staked to extensions of a plurality of legs of a magnet cage, the cage and the cover plate serving to confine a plurality of wedge-shaped magnets longitudinally therebetween, with the magnets being retained circumferentially by the shapes of the legs.

These and other objects and advantages of the invention will be apparent from the following drawings and accompanying description.

BRIEF DESCRIPTION OF THE DRAWINGS

FIG. 1 is a side elevational view of a rotor assembly assembled by the inventive method;

FIG. 2 is an exploded view of the components of the rotor assembly of FIG. 1.

BEST MODE OF CARRYING OUT THE INVENTION

Figure 3:
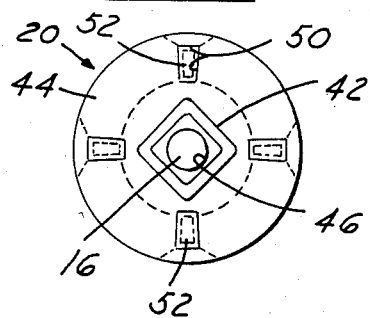
FIGS. 3-6 are cross-sectional views taken along the respective lines 3—3, 4—4, 5—5 and 6—6 of FIG. 1, and looking in the directions of the respective arrows.

Referring now to the drawings in greater detail, FIG. 1 illustrates a rotor assembly 10. FIG. 2 illustrates the components of the rotor assembly 10 in an exploded relationship ready for assembly, the components consisting of a magnet cage 12, a sleeve 14, a shaft 16, a plurality of magnets 18, and a cover or trap plate 20.

The magnet cage 12 is formed of a suitable plastic to include a central washer-like segment 22 having a cylindrical portion 24 extending from one face thereof and four equally spaced legs 26 extending from four radial outer edge portions of the other face thereof. As may be noted in FIG. 5, in cross section, each leg 26 is substantially rivet-shaped and includes a body portion 28 which is tapered so as to be narrowest at the radial inner edge thereof, and a head portion 30 which is flared outwardly at the radial outer end portion thereof, with both the inner and outer surfaces 32 and 34 thereof being concentric, the outer arcuate surface 34 coinciding with the outer surface of the central washer-like segment 22. As shown in FIG. 2, the tapered body portion 28 extends longitudinally beyond the end 36 of the flared portion 30, providing extensions 38 for a purpose to be described.

At assembly:

I. The sleeve 14 is first inserted into the space within the four legs 26 to seat against the washer-like segment 22, the sleeve 14 having (1) an outside diameter which fits snugly within the inside diameter formed by the arcuate inner surfaces 32 of the four tapered portions 28 of the legs 26, and (2) an inside diameter the same as the inside diameter of the cylindrical portion 24 of the magnet cage 12.

II. The shaft 16 is next press-fitted through the cage 12/sleeve 14 sub-assembly, extending from both ends thereof, the shaft 16 having two spaced knurled or longitudinally grooved sections 40 for securing the shaft within the sleeve 14 and the cylindrical portion 24 of the magnet cage 12.

Figure 5:
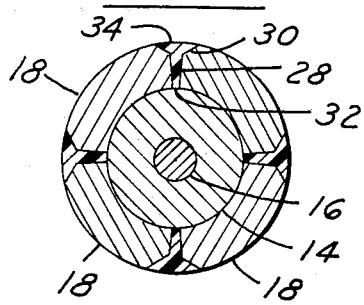
Figure 4:
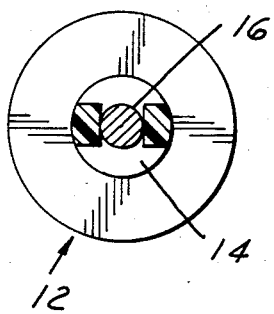

III. Four magnets 18 are next inserted into the spaces between the four legs 26, around the outer peripheral surface of the sleeve 14. As shown in FIG. 5, each magnet 18 includes concentric inner and outer surfaces coinciding respectively with the outer surface of the sleeve 14 and the outer surface of the washer-like segment 22. Both sides of each magnet 18 are shaped to match the tapered inner portion 28 and the flared outer portion 30 of adjacent legs 26 of the cage 12. The magnets are retained in place against the sleeve 14 by the flared outer portions 30 of adjacent legs 26.

Figure 6:
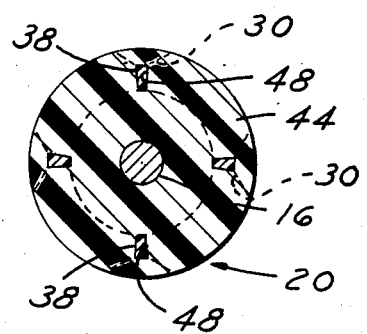

IV. The cover plate 20, formed of a suitable plastic, is then mounted around the shaft 16, onto the seat provided by the ends 36 of the flared portions 30 of the four legs 26 and against the end faces of the four magnets 18. As may be noted from FIGS. 2, 3, and 6, the cover plate 20 includes a square end portion 42, with a circular flange 44 on one end thereof, and an opening 46 formed therethrough coinciding with the inner diameters of the sleeve 14, the central segment 22 and cylindrical portion 24. Four equally spaced radial slots 48 are formed through the flange 44, the slots matching the shapes of the tapered extensions 38 beyond each of the flared portions 30. Chamfers 50 (FIGS. 2 and 3) are formed on the four edges of each slot 48 on the outer or square end 42 side of the flange 44 for the purpose to be described in the next step.

V. A final staking or deforming operation is performed against the ends 52 of the extensions 38 of the tapered portion 28, causing the latter to be deformed onto the chamfers 50 to assume a shape substantially as shown in FIG. 3 and thereby securely retain the assembly in its final assembled condition.

INDUSTRIAL APPLICABILITY

It should be apparent that the invention provides an improved rotor assembly and an efficient method of assembling the components thereof, without the need for rivets, heat shrinking, punch ramming, or locking wedge action to hold the assembly together.

While but one embodiment has been shown and described, other modifications thereof are possible within the scope of the following claims.

The embodiments of the invention in which an exclusive property or privilege is claimed are defined as follows:

1. A permanent magnet rotor assembly comprising a magnet cage having a washer-like segment with a plurality of equally spaced legs extending from the outer peripheral portions of one face thereof, with each of said legs being shaped such that the opening between adjacent legs at the outer surface thereof is narrower than the opening between the legs at an intermediate height thereof, a sleeve mounted in the center of the plurality of legs against said washer-like segment, a shaft press fitted through said sleeve and said cylindrical extension, a plurality of wedge-shaped magnets mounted around said sleeve, with each magnet confined between adjacent legs are retained thereby against said sleeve within said narrower outer opening, and a cover plate having a plurality of central and radial openings formed therein, said shaft and the end portions of said legs beyond said magnets extending through the respective central and radial openings, the end portions of said legs being deformed in said radial openings to secure the rotor assembly.

2. A rotor assembly comprising a magnet cage having a central washer-like segment with a cylindrical extension formed on one face thereof and a plurality of equally spaced legs extending from the outer peripheral portions of the other face thereof, with each of said legs having concentric inner and outer surfaces and a substantially rivet-shaped cross-section with the head thereof being tapered inwardly from the outer surface thereof, a sleeve mounted in the center of the plurality of legs against said washer-like segment, a shaft press-fitted through said sleeve and said cylindrical extension, a plurality of wedge-shaped magnets mounted around said sleeve, with each magnet confined between adjacent legs and retained therebetween and against said sleeve by said tapered head of said rivet-shaped cross-section of said adjacent legs, and a cover plate having a central opening and a plurality of equally spaced radial slots formed therein, with said radial slots being chamfered on one side thereof, said cover plate being mounted around said shaft and onto the end portions of said legs beyond said magnets such that said end portions extend through the respective radial slots and are deformed into the chamfered portions thereof to secure the rotor assembly.

* * * * *